UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

PROCESS OF PRODUCING PHENOLIC CONDENSATION PRODUCTS.

1,310,087. Specification of Letters Patent. Patented July 15, 1919.

No Drawing. Application filed September 16, 1918. Serial No. 254,368.

*To all whom it may concern:*

Be it known that we, LAWRENCE V. REDMAN, a citizen of Canada, who has taken out his first papers for citizenship in the United States, a resident of Evanston, Cook county, Illinois, ARCHIE J. WEITH and FRANK P. BROCK, citizens of the United States, residing at Chicago, in the county of Cook and State of Illinois, have invented a new and useful Improvement in Processes of Producing Phenolic Condensation Products, of which the following is a specification.

This invention relates particularly to the production of a phenolic condensation product from a phenolic body and formaldehyde; and the improved process is particularly desirable for use in producing a transparent or semi-transparent product.

The present invention provides a simple and easily practised method of producing a phenolic condensation product from a phenolic body and formaldehyde, without the use of a catalyzing agent.

The improved process may be practised as follows:

Mix together 3 parts of a 40 per cent. solution of formaldehyde ($CH_2O$) and 5 parts of phenol ($C_6H_5OH$); boil the mixture at atmospheric pressure for a period which will vary according to the quantity and the precise character of the phenolic body employed, continuing the boiling usually from 60 to 120 hours, until there results a lower layer in the nature of a viscous creamy mass and an upper layer of water which is virtually free from formaldehyde, but which may contain from a trace to perhaps 2 per cent. of formaldehyde.

It is ordinarily desirable to use phenol or a phenolic body composed largely of phenol and comprising its homologues, or some of them (such as ortho, meta and para cresol), where a clear, transparent product is desired. However, cresol or a mixture of cresols may be used where a cheaper product is desired and where the question of color is not of great importance.

Ordinary commercial cresol may be used, in which case the boiling period may be shortened, so as to cover a period from four to twelve hours; and if crude cresol be used, the period may be shortened to about two hours.

In using pure phenol, or approximately pure phenol, the reaction may be hurried by closing the still or reflux condenser and allowing the pressure to increase until the temperature rises to 125° C., or higher, or well above 100° C., in which case the boiling period may be reduced so that it need not exceed twelve to eighteen hours.

The mixture may be boiled until the formaldehyde substantially disappears from the supernatant watery layer, and this may be done without unduly hardening the resin or gelatinizing it, so that extreme care is unnecessary in dealing with the material at this stage.

After producing a resinous mass containing a large excess of phenol in the manner described, the mass is poured into an evaporator, fitted with a stirrer, the water being discarded. There is then added 2 parts of formaldehyde, that is, two-thirds of the original amount of formaldehyde employed, and this is stirred into the mass in the evaporating tank, the mass being, at the beginning of this operation, at a temperature of about 100° C. While stirring in the additional formaldehyde, the mass is allowed to cool to about 60° to 70° C. The mass is then boiled and rapidly concentrated, the water evaporating and some of the formaldehyde escaping, which, however, may be condensed and collected. This heating operation may be carried on under atmospheric pressure and the temperature will rise to 115° C. or possibly somewhat higher. Ordinarily, it is desirable to carry the concentration to a point which renders the mass quite viscous but still permits pouring. The boiling should be stopped before the material reaches the gelatinous state.

After the concentrating operation, there preferably is introduced into the mass a small additional amount of formaldehyde, say three to five per cent. of the mass to replace any loss occurring during concentration, and the material is poured into molds and allowed to "set" at a temperature of about 50° C. to 100° C. After the material has become sufficiently firm or "set," it is removed from the molds and kept at a temperature of, say from 50° to 100° C. for a period of several weeks, or several months, depending on the thickness of the mass. The material may remain in the molds for a period of several days to enable it to become sufficiently firm to be removed from the molds, depending upon the mass, temperature, etc.

After the material has been mildly heated for a prolonged period of several weeks, or several months, as the case may be, it finally becomes quite hard and may be used for such purposes as making pipe-stems, pipes, cigar-holders, cigarette-holders, etc. Where a high-grade phenolic body is employed in the manufacture, the condensation product is of amber-like color, but may have a tinge of orange or red in it. The material is, however hard and tenacious, and substantially transparent.

The material may be given a finer color, greater tenacity and finer temper by subjecting it, after the prolonged mild heat treatment, to a higher temperature for a comparatively short period of time. In this manner, there may be produced a material which may be machined, sawed, sandpapered, etc., more satisfactorily. For instance, the material after treating at a higher temperature, may be sandpapered and buffed with much better effect and at smaller cost, as gumming of the sandpaper or buffing material will thereby be largely obviated.

The preferred method of eliminating the orange or reddish color or tint, which the product may have after the prolonged mild heat treatment, is to continue such mild application of heat until the material is practically anhydrous and quite hard and capable of being used commercially for the manufacture of pipe-stems, cigar-holders and the like, and then subject the block of material, in a kiln, to a temperature above 100° C. for a period of several days. It is preferred to employ a temperature of approximately 125° C. for this auxiliary heat treatment, although it is practicable to range to a temperature as high as 150° C. or higher, but unnecessary to exceed 150° C. This results in the production of a clear amber, or light lemon color, and produces a material which works more easily, tools better, possesses higher tensile strength, is finer tempered, and may be sandpapered and buffed with greater facility. It is probable that some colloidal change takes place in the material during this treatment, which improves the product, giving it a finer color, a better temper, and increased tensile strength.

The material produced in the first step of the process, which contains a large excess of phenol, is soluble in the usual solvents, and, at a temperature of about 100° C., may be poured or discharged with facility into the evaporator. The material, after concentrating with a second supply of formaldehyde, molding, and hardening by prolonged mild heat treatment, is practically infusible and insoluble, but, as stated, its qualities may be improved by the subsequent heat treatment at a higher temperature. After such subsequent treatment, the material remains, of course, insoluble and infusible.

In the second stage of the process, one may add to the formaldehyde a very small proportion of hexamethylenetetramin, say, $\frac{1}{10}$ of one per cent. of the amount of the formaldehyde in the solution. This will result in the production of a material which "sets" more quickly.

In the first step of the process, one may use 30 cubic centimeters of a 40 per cent. formaldehyde solution and 50 cubic centimeters of phenol; and in the second stage of the process, one may add 20 cubic centimeters of a 40 per cent. solution of formaldehyde.

The color may be varied by introducing suitable coloring materials during the second step of the process. For instance, one may introduce auramin, to produce a deep amber color; methyl violet, to produce amethyst; acetyl red, to produce "dregs of wine", etc. The coloring material should be added in small quantity, usually not exceeding $\frac{1}{2}$ of 1 per cent. of the mass. Oils or waxes may be introduced in small quantity, if desired, during the second step of the process, to produce opaque material. Ground mica or fish scales may be used to produce a shimmering effect.

The improved process is simple, may be practised with facility, and obviates the use of condensing agents, whether acid, salt or base. The process enables a product of high-grade, great purity and finest qualities to be produced with great permanence of color and with no deleterious substances included, such as might be formed, for instance, in an effort to neutralize a condensing agent. It is desirable that the formaldehyde and phenolic body should be used in such proportions as to ultimately provide slightly more of the phenolic body than corresponds with equi-molecular proportions. For example, it is desirable to have the phenol product correspond with the union of about $6\frac{1}{2}$ phenol groups to six methylene groups. We have formed a satisfactory product, using as high as $7\frac{1}{2}$ phenol groups to 6 methylene groups.

The concentration may be performed *in vacuo*, if desired; and the hardening operation may be performed at atmospheric pressure, or at higher pressure, or at reduced pressure, or *in vacuo*.

The foregoing detailed description has been given for clearness of understanding only, and no unnecessary limitation should be understood therefrom, but the appended claims should be construed as broadly as permissible in view of the prior art.

What we regard as new and desire to secure by Letters Patent is—

1. The process of producing a phenolic condensation product, without the use of a condensing agent, which comprises: boiling together a solution of formaldehyde and a phenolic body taken largely in excess of the formaldehyde, until the formaldehyde is substantially eliminated from the supernatant aqueous layer which forms and a viscous gummy lower layer is produced; discarding the aqueous layer; mixing with the gummy mass a solution of formaldehyde in lesser proportion than in the first step and concentrating by application of heat; pouring the mass into molds and setting at a temperature below 100° C.; and removing the material from the molds and hardening at a temperature below 100° C.

2. The process of producing a phenolic condensation product, without the use of a condensing agent, which comprises: boiling together approximately 3 parts of a 40 per cent. formaldehyde solution and 5 parts of a phenolic body until the formaldehyde is substantially eliminated from the supernatant aqueous layer which forms and a viscous gummy lower layer is produced; discarding the aqueous layer; mixing with the gummy mass a 40 per cent. solution of formaldehyde taken in proportions of about two-thirds of the original amount of formaldehyde employed and concentrating at a temperature in excess of 100° C.; pouring the mass into molds and setting at a temperature below 100° C.; and removing the material from the molds and subjecting the same to heat treatment for a prolonged period at a temperature below 100° C.

3. The process of producing a phenolic condensation product, without the use of a condensing agent, which comprises: boiling together about 3 parts of a 40 per cent. formaldehyde solution and 5 parts of phenol, until the formaldehyde is substantially eliminated from the supernatant aqueous layer which forms and a viscous gummy lower layer is produced; discarding the aqueous layer; mixing with the gummy mass a 40 per cent. formaldehyde solution in an amount equal to about two-thirds of the amount employed in the first step, and concentrating at a temperature exceeding 100° C.; and then forming the mass and hardening it by subjecting to heat treatment for a prolonged period at a temperature below 100° C.

4. The process of producing a phenolic condensation product, without the use of a condensing agent, which comprises: boiling together a solution of formaldehyde and a phenolic body taken largely in excess of the formaldehyde, until the formaldehyde is substantially eliminated from the supernatant aqueous layer which forms and a viscous gummy lower layer is produced; discarding the aqueous layer; mixing with the gummy mass a solution of formaldehyde in lesser proportion than in the first step and a very small proportion of hexamethylenetetramin and concentrating at a temperature above 100° C.; pouring the mass into molds and "setting" at a temperature below 100° C.; and removing the material from the molds and hardening it by subjecting to prolonged heat treatment at a temperature below 100° C.

5. The process of producing a phenolic condensation product, which comprises: condensing together a formaldehyde solution and a phenolic body in proportions adapted to produce a hard insoluble body; subjecting the same to prolonged heat treatment at a temperature below 100° C. until a hard, resistant and substantially anhydrous body is produced throughout the mass; and then subjecting such body to heat treatment for a relatively short period at a temperature exceeding 100° C.

6. The process of producing a phenolic condensation product, which comprises: condensing together a formaldehyde solution and a phenolic body under conditions which afford somewhat more than one phenolic group to each methylene group in the final product; subjecting the material to prolonged heat treatment at a temperature below 100° C. until a hard, resistant and substantially anhydrous body is produced throughout the mass; and then subjecting such body to heat treatment for a relatively short period at a temperature exceeding 100° C.

7. The process of producing a phenolic condensation product, without the use of a catalyzer, which comprises: boiling together a formaldehyde solution and a phenolic body in proportions affording more than 1½ phenolic groups to each methylene group, until the formaldehyde is substantially eliminated from the supernatant aqueous layer which forms and a viscous gummy lower layer is produced; discarding the aqueous layer; mixing with the gummy mass a solution of formaldehyde in such quantity that the final product will correspond with at least one phenol group for each methylene group and concentrating the mixture at a higher temperature; hardening the mass by heat treatment for a period of several weeks at a temperature below 100° C. until the material is substantially anhydrous; and then subjecting the same to heat treatment for a relatively short period at a temperature exceeding 100° C.

LAWRENCE V. REDMAN.
ARCHIE J. WEITH.
FRANK P. BROCK.